Figure 1:
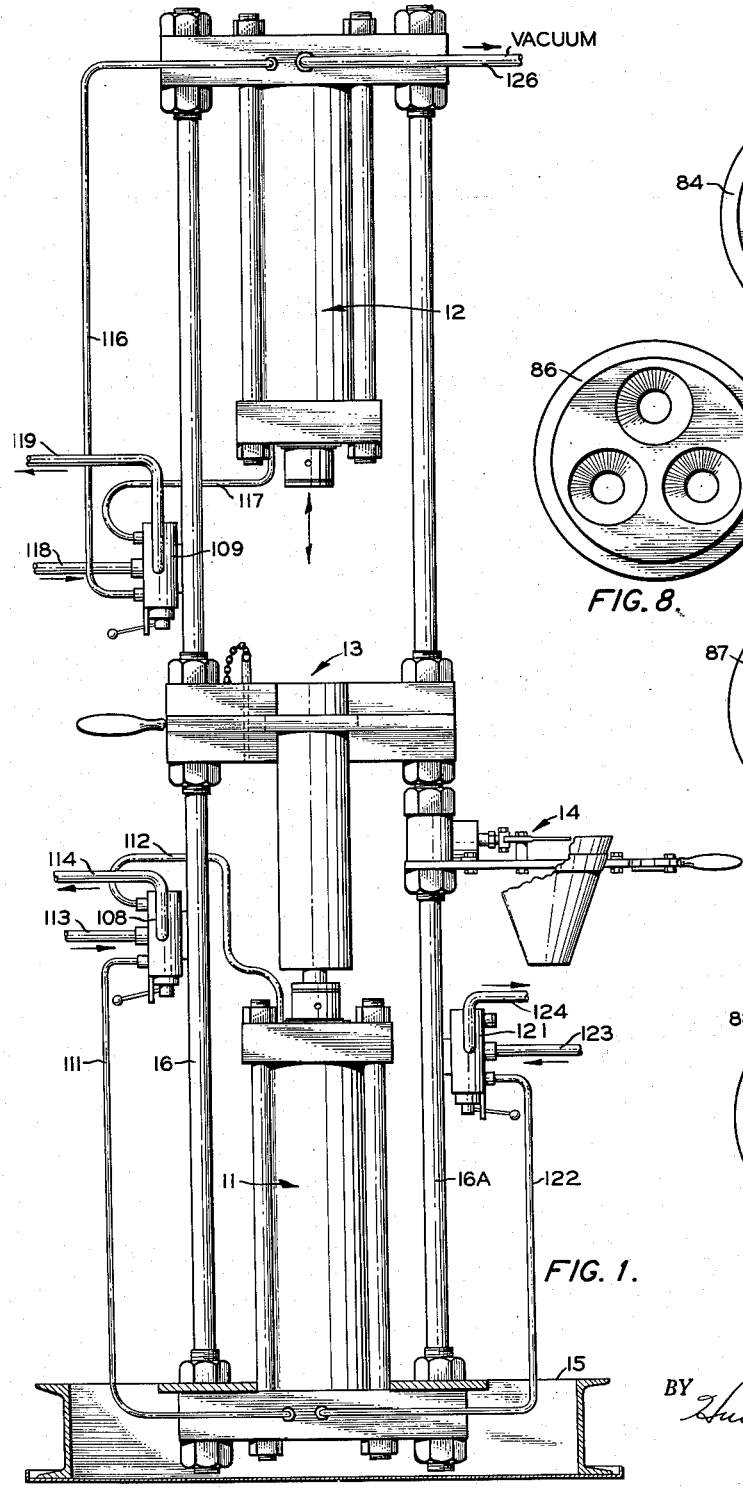
Figure 7:
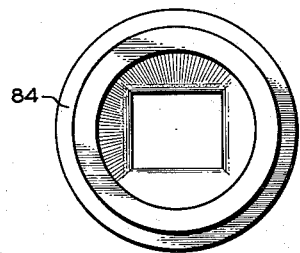
Figure 8:
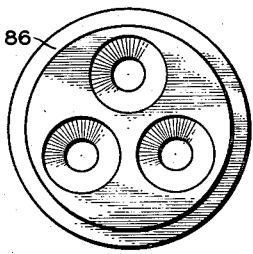
Figure 9:
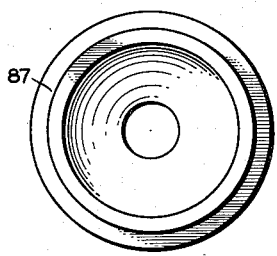
Figure 10:
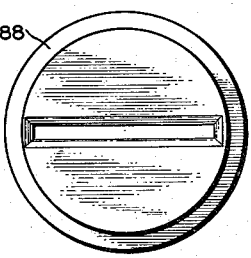

Aug. 1, 1961

R. L. POSEY 2,994,106

MOLDING EXTRUSION PROCESS AND APPARATUS

Filed May 7, 1956

5 Sheets-Sheet 1

INVENTOR.
R. L. POSEY

BY *Hudson and Young*

ATTORNEYS

INVENTOR.
R. L. POSEY
BY Hudson and Young
ATTORNEYS

INVENTOR.
R. L. POSEY
BY Hudson 3rd Young
ATTORNEYS

United States Patent Office 2,994,106
Patented Aug. 1, 1961

2,994,106
MOLDING EXTRUSION PROCESS AND APPARATUS
Robert L. Posey, Bartlesville, Okla., assignor to Phillips Petroleum Company, a corporation of Delaware
Filed May 7, 1956, Ser. No. 582,972
18 Claims. (Cl. 18—16.5)

This invention relates to a process and apparatus for molding and extruding solid moldable materials into articles of desired configuration. A specific aspect of the invention pertains to a process and a press for shaping rocket fuel grains.

Solid moldable plastic materials are frequently molded and extruded into articles of desired configuration. One application of the process and apparatus of the invention is in the molding or extrusion of rocket grain material into so-called "grains" for use in rocket motors and for JATO (jet assist takeoff) units for assisting military and commercial aircraft in taking off the ground when heavily loaded. These rocket motors and JATO units utilize a solid fuel compacted into special configurations for certain type burning patterns. One particularly advantageous configuration comprises a cylindrical grain having a hollow core for mounting on rods in the rocket motor of the JATO unit.

The press and process of the invention are particularly adapted to compressing solid rocket fuels into the shape or configuration required for certain rocket motors and JATO units. A specific solid fuel which is readily moldable or extrudable into uniform shapes comprises a homogeneous mixture of synthetic rubber, ammonium nitrate, and carbon black. The invention is also applicable to the molding or extrusion of ceramic materials such as moldable clays for various uses, including uses as catalysts and adsorbents. It is also applicable to the molding and extrusion of plastics such as solid polyethylene, polybutadiene, and other solid resins and plastics.

Accordingly, it is an object of the invention to provide a novel process and press for molding and extruding solid moldable plastic materials. Another object is to provide a press which is of more simple construction and more easily maintained than conventional presses. A further object is to provide an improved process and apparatus for molding solid rocket propellant grains in a cylindrical configuration having a hollow core. It is also an object of the invention to provide a molding and extrusion press containing interchangeable molding and extrusion assemblies. Other objects of the invention will become apparent from a consideration of the accompanying disclosure.

One aspect of the invention comprises a molding press in which is positioned a molding cylinder and a pair of opposed compression pistons one of which carries a coaxial separately reciprocable core piston or mandrel, said compression pistons being separately reciprocable in said cylinder. In a second embodiment of the invention the molding assembly is removable and replaceable by an extrusion mold assembly in which extrusion of extrudable material is effected by one of the aforesaid compression pistons. A further embodiment of the invention comprises, in combination with said second embodiment, a cutoff assembly pivotally mounted on the press and rotatable into and out of cutting position as required with extrusion molding and with compression molding, respectively. The press is preferably positioned and operated vertically, particularly when extrusion molding.

Figure 2:
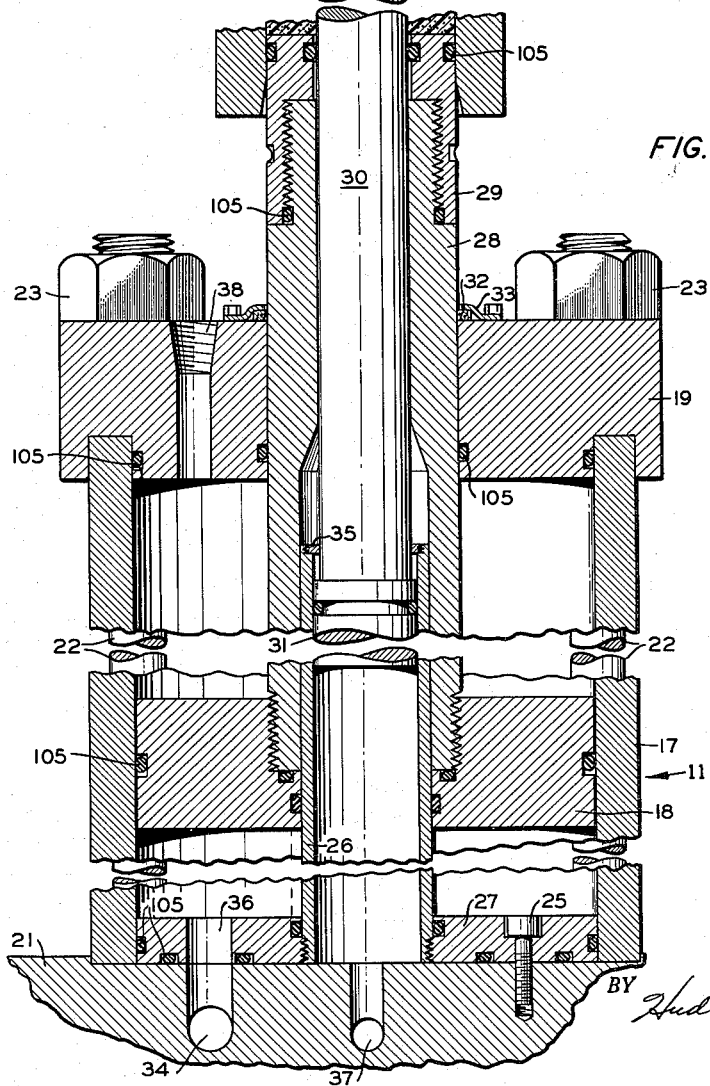
Figure 3:
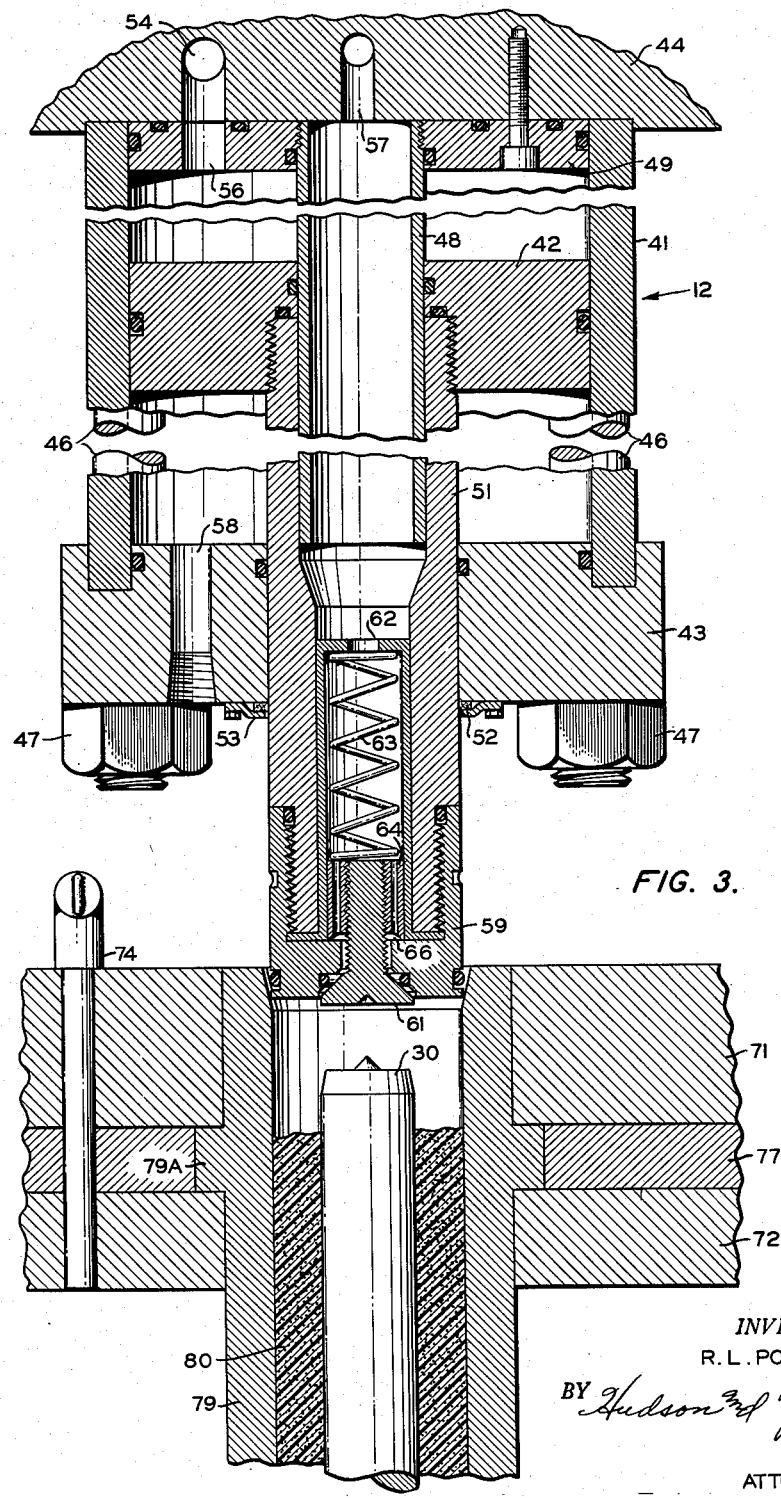
Figure 4:
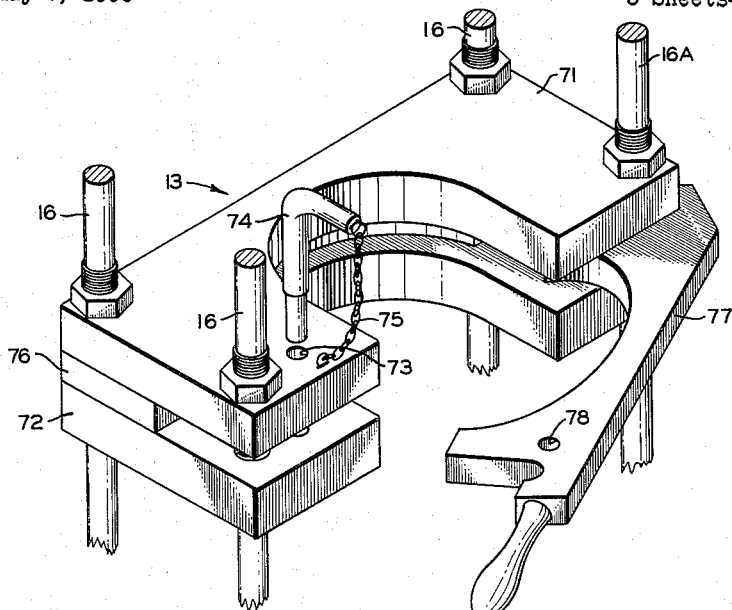
Figure 6:
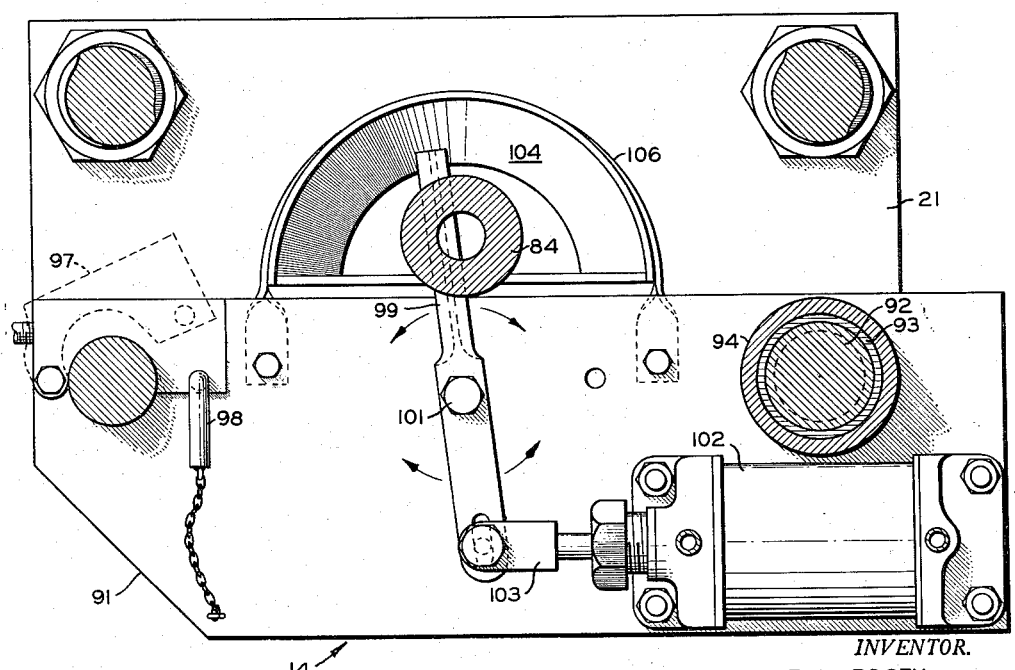
Figure 5:
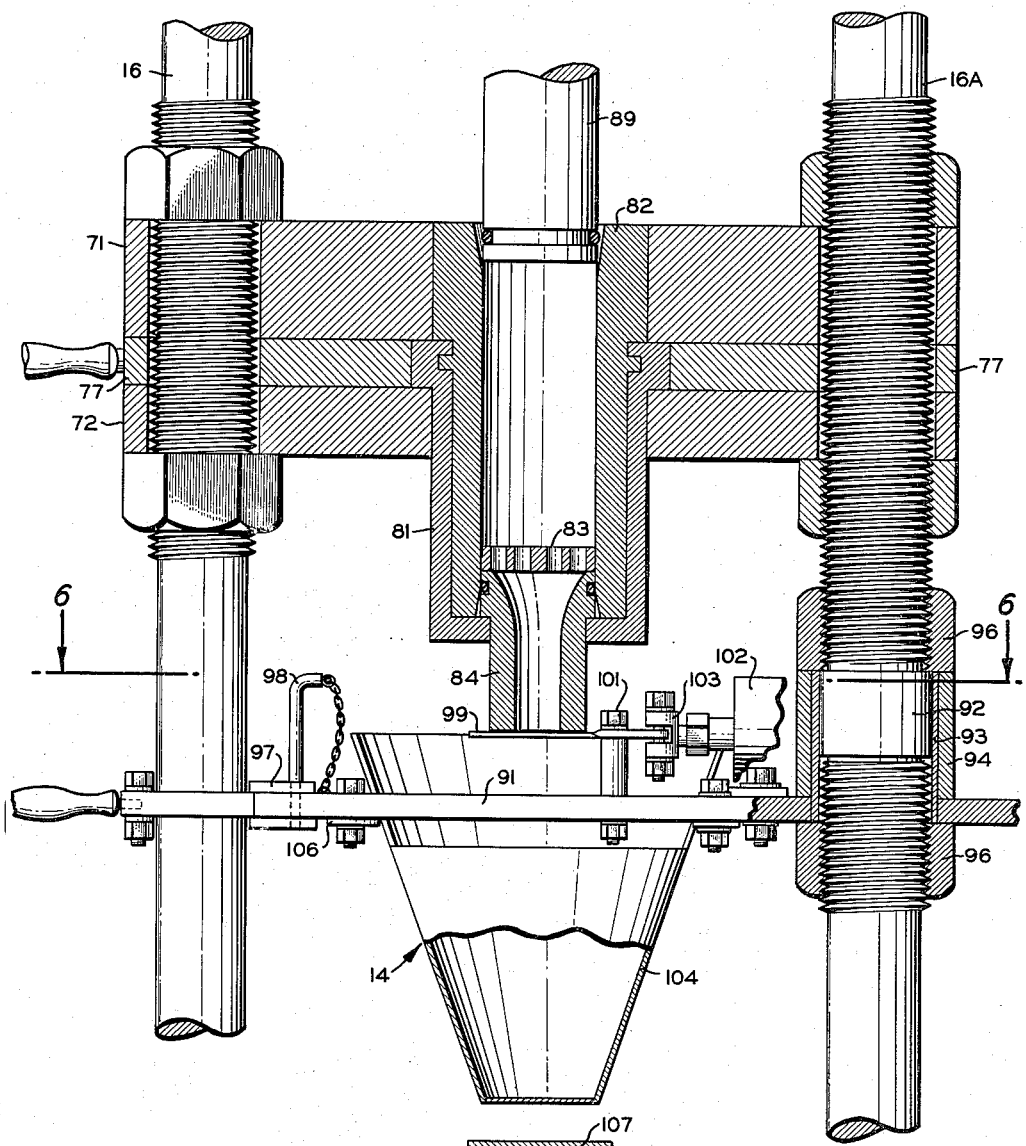

More complete understanding of the invention is provided by reference to the accompanying drawing of which FIGURE 1 is an elevation of the complete propellant press; FIGURE 2 is a vertical cross section of lower cylinder 11 and a portion of compression mold assembly 13 of FIGURE 1; FIGURE 3 is a vertical cross section of upper cylinder 12 and a portion of compression mold assembly 13 of FIGURE 1; FIGURE 4 is an isometric view of a portion of compression mold assembly 13; FIGURE 5 is a vertical cross section of an extrusion mold assembly which can be substituted for compression mold assembly 13; FIGURE 6 is a plan view of cutoff assembly 14 taken on line 6—6 of FIGURE 5, and FIGURES 7, 8, 9, and 10 are modifications of extrusion mold die 84 of FIGURE 5.

Referring to FIGURE 1, the propellant press comprises lower cylinder 11, upper cylinder 12 and compression mold assembly 13, attached together by means of support rods 16 and cutoff support rod 16A and nuts as shown. Cutoff assembly 14 is attached to cutoff support rod 16A and the entire press is supported on base 15.

As illustrated in FIGURE 2, lower cylinder 11 comprises cylinder 17, in which is fitted piston 18. Cylinder 17, cylinder head 19, and base plate 21 are held together by bolts 22 and nuts 23. Piston guide 26 is attached to piston guide support 27 by threads as shown which is attached by screws or bolts 25 to base plate 21. Piston rod 28 is threaded into piston 18 and extends upward through cylinder head 19. Lower piston head 29 is threaded to the upper end of piston rod 28. Mandrel 30 is slidable in the upper portion of piston rod 28 while mandrel piston 31, threaded to the mandrel, fits in the inner bore of piston guide 26, guide 26 acting as a cylinder for piston 31. Mandrel stop 35 is threaded to the upper portion of piston guide 26, restricting upward motion of mandrel piston 31. A felt wiper ring 32, held in place by retainer ring 33, maintains the outer surface of piston rod 28 clean at the point where it enters cylinder head 19. Fluid passage 34 in base plate 21 coincides with fluid passage 36 in piston guide support 27 to allow hydraulic fluid to enter and leave cylinder 17 below piston 18. Fluid passage 37 allows air or other motive fluid to enter and leave piston guide 26 below mandrel piston 31. Fluid passage 38 permits hydraulic fluid to enter and leave cylinder 17 above piston 18.

In FIGURE 3, cylinder 41, piston 42, cylinder head 43, base plate 44, bolts 46, nuts 47, piston guide 48, piston guide support 49, piston rod 51, felt wiper ring 52, retainer ring 53, fluid passages 54, 56, 57, and 58 all correspond with similarly named parts of lower cylinder 11. Upper piston head 59, attached to the lower end of piston rod 51, is designed to accommodate vacuum valve 61. Spring holder 62, the lower flange of which is retained between piston rod 51 and upper piston head 59, holds valve spring 63 against valve guide 64 which is threaded to the stem of vacuum valve 61. Valve guide 64 contains a plurality of fluid passages 66 which cooperate with valve 61 in passing gases upwardly into the interior of piston guide 48.

As illustrated in FIGURE 2, FIGURE 3, and FIGURE 4, compression mold assembly 13 comprises upper mold holding plate 71, lower mold holding plate 72, center stationary mold holding plate 76 and center movable mold holding plate 77. Flange 79A of mold 79 is held between plates 71 and 72 which are spaced apart the thickness of flange 79A by center stationary mold holding plate 76. Center movable mold holding plate 77 is pivoted on cutoff support rods 16A and can be rotated toward or away from plates 71 and 72 to lock in place or permit the removal of mold 79. A hole 73 in plate 71 can be aligned with hole 78 of plate 77 to permit the insertion of pin 74 to lock the mold in place. Pin 74 is attached to plate 71 by chain 75. A mass of propellant material 80 is illustrated in mold 79.

The extrusion mold assembly illustrated in FIGURES 5 and 6 utilizes some of the parts of the compression mold assembly described above. Mold 79 is replaced by extrusion support 81, which is split longitudinally to permit the insertion of extrusion mold 82. Extrusion mold plate 83 and extrusion mold die 84 complete the molding portion of the assembly. The die 84 is the square beam test die illustrated in FIGURE 7 and can be replaced by dies for extruding other configurations, such as the multiple strand die 86 of FIGURE 8, the single strand die 87 of FIGURE 9 or the ribbon die 88 of FIGURE 10. For the extrusion mold in operation, upper piston head 59 is replaced by extrusion piston 89.

Cutoff assembly 14 is supported by cutoff plate 91 which is pivotally mounted on enlarged cylindrical section 92 of cutoff support rod 16A by means of cylindrical spacer 93, sleeve 94, welded to plate 91 and nuts 96. This construction permits the entire assembly to be rotated out of the way as illustrated in FIGURE 1 when the machine is used for compression molding or to be swung into the operative position as illustrated in FIGURE 5 when the machine is used for extrusion molding. A pivoted lock 97 is used to hold plate 91 in position during extrusion molding, pin 98 being used to hold the lock in place. A knife 99 is attached to plate 91 by a vertical pivot 101 and is actuated by air cylinder 102 to which it is attached by air cylinder adapter 103. Air cylinder 102 is a commercial item and, therefore, is not described in detail. A source of air pressure (not shown) is connected with air cylinder 102 to permit the actuation of knife 99 when desired. Strand holder 104 is attached to plate 91 by strap 106. Lower piston cap 107 replaces lower piston head 29 during the extrusion molding operation. O-rings 105 are provided as sealing means in various sections of the device as shown in the several figures of the drawing.

The control system for the press includes a hydraulic control valve 108 for lower cylinder 11 and a similar hydraulic control valve 109 for upper cylinder 12 (FIGURE 1). Hydraulic pressure lines 111 and 112 connect with the lower and upper portions of cylinder 17 through passages 34 and 38, respectively. Hydraulic supply line 113 and hydraulic exhaust line 114 also are connected with valve 108. Actuation of valve 108 permits hydraulic fluid under pressure to be supplied above or below piston 18, the opposite space being connected to exhaust. Similarly hydraulic pressure lines 116 and 117 connect with the upper and lower portions of cylinder 41 through passages 54 and 58, respectively. Hydraulic supply line 118 and hydraulic exhaust line 119 are connected with valve 109 to permit the application of pressures above or below piston 42, the opposite side being connected with exhaust. Air valve 121 is connected with passage 37 through air pressure line 122 and permits air to be supplied under pressure from air supply line 123 or to be exhausted through air exhaust line 124. Vacuum line 126 communicates with passage 57 to vent the space within piston guide 48.

In operation, when the press is to be used for compression molding, the apparatus is assembled as illustrated in FIGURE 1 by swinging cutoff assembly 14 out of operating position, inserting mold 79 and locking it in place by means of movable plate 77 and pin 74 and installing upper and lower piston heads 59 and 29. Piston head 29 is inserted in the lower end of mold 79 so as to seal off the lower end of the mold by means of O-rings 105 and core piston or mandrel 30 is then extended by means of gas pressure admitted through lines 122 and 37 to the interior of liner 26 so that mandrel 30 extends substantially through the mold. The material to be molded is then introduced to mold 79 around mandrel 30 in sufficient amount to provide the size grain or other article desired. Then piston head 59 is moved into the upper end of the mold 79 by hydraulic fluid introduced by means of line 116 behind piston 42 so as to seal the upper end thereof and trapped gas within mold 79 is evacuated around valve 61 by applying a vacuum through line 126 and port 57. After evacuation is complete hydraulic pressure is again applied to piston 42 so as to move piston head 59 into contact with mandrel 30 whereby valve 61 is closed. From this point on compression of moldable material 80 can be effected by moving either or both pistons 29 and 59 farther into the mold. A more homogeneous grain or molded article is produced by compressing the mass of material 80 from both ends and this procedure is preferred. As piston head 59 moves farther into the mold mandrel 30 is forced back into its piston in liner 26 against the trapped gas therein which is readily compressible and does not offer appreciable resistance compared with the hydraulic pressure applied to piston 42. It is also feasible to open the exhaust line so as to avoid build up of pressure behind mandrel 30. After the desired pressure has been applied on material 80 so as to effect the desired amount of compression, the molded article is removed from the mold. The preferred method of removing the molded article from the mold is to withdraw piston head 59 by applying hydraulic pressure to the underside of piston 42 and thereafter continuing the application of hydraulic pressure to the underside of piston 18 so as to force the molded grain or article upwardly through the mold.

When it is desired to use the machine for extrusion molding, mold 79 is replaced by the assembly comprising extrusion mold support 81, extrusion mold 82, extrusion mold plate 83 and extrusion mold die 84. Cutoff assembly 14 is swung into place and locked by pivoted lock 97 and pin 98. Upper piston head 59 is replaced by extrusion piston 89 and lower piston head 29 is replaced by lower piston cap 107. A mass of propellant material is inserted into extrusion mold 82 and hydraulic pressure is applied above piston 42, thus forcing extrusion piston 89 downward and causing the propellant material to pass through extrusion mold plate 83 and extrusion mold die 84 to form a strand or ribbon of the desired configuration and size. This extruded piece is cut into desired lengths by supplying air to air cylinder 102 to actuate knife 99 at the desired time by timing means not shown synchronized with the operation of piston 89.

Certain modifications of the invention will become apparent to those skilled in the art and the illustrative details disclosed are not to be construed as imposing necessary limitations on the invention.

I claim:

1. Compression molding apparatus comprising in combination a molding chamber open at both ends; a pair of opposed compression pistons closely fitting said chamber and adapted to move into opposite ends of said chamber and toward each other therein; an elongated core piston coaxial with one of said compression pistons and slidable within same so as to extend therefrom into said chamber when its respective compression piston is entered therein to contact the other piston and form a hollow core in material molded in said chamber, the other of said pair of pistons occupying the entire transverse cross-sectional area of said chamber and being provided with a valved conduit in the nose thereof for evacuating gas from said chamber during its initial forward movement within said chamber.

2. The apparatus of claim 1 wherein the valve in said valved conduit comprises a valve head adapted to seat against the forward end of its respective piston upon contacting the forward end of said core piston and open when not in contact therewith.

3. The apparatus of claim 2 wherein said valve head is self-centering on said core piston.

4. The apparatus of claim 1 including a fixed tube disposed axially within said one of said compression pistons to serve as a cylinder for said core piston; and means for introducing an actuating fluid into the end of said tube remote from said chamber to force said core piston toward and into said chamber.

5. The apparatus of claim 4 including close-fitting cylinders for each of said compression pistons coaxial with said chamber and spaced apart from opposite ends thereof; closure means on the ends of said cylinders remote from said chamber; and means for introducing a hydraulic fluid into each of said cylinders between said closure means and the piston therein.

6. The apparatus of claim 5 wherein the compression piston within which said core piston is disposed comprises an elongated tube slidably engaging said fixed tube and an enlarged section on the end thereof remote from said compression chamber which slidably engages a cooperating enclosing cylinder; and further including a closure member on the end of said last named cylinder adjacent said chamber having an aperture therein which slidably engages said elongated tube.

7. Compression molding apparatus comprising in combination a molding chamber open at both ends; a pair of opposed compression pistons closely fitting said chamber and adapted to move into opposite ends of said chamber and toward each other therein; an elongated core piston coaxial with one of said compression pistons and slidable within same so as to extend therefrom into said compression chamber a substantial distance when its respective compression piston is entered therein and form a hollow core in material molded in said chamber, the other of said pair of pistons occupying the entire transverse cross-sectional area of said chamber and being provided with a valved conduit in the nose thereof for evacuating gas from said chamber during its initial forward movement within said chamber; a supporting frame for said molding chamber and said compression pistons holding same in axial alignment with each other; and means for operating each compression piston to move same into and out of said chamber to mold a moldable material and eject the resulting molded article from said chamber.

8. The apparatus of claim 7 wherein said frame comprises four upright parallel rods in a rectangular pattern connecting parallel spaced-apart end plates; and including a housing cylinder for each said compression piston fixed to its respective end plate; an annular support flange on the outside of said molding chamber; a pair of spaced-apart support plates fixed to said rods and having matching U-shaped slots therein of a width larger than the external diameter of said chamber and smaller than the external diameter of said flange to permit sliding said chamber into axial alignment with said pistons; a spacer plate between said support plates extending from the rods opposite said U-slots to a line thru the center of said chamber and having substantially a semi-circular slot in its inner edge to accommodate half of said flange; and a pivotable clamping plate between said support plates in a common plane with said spacer plate pivoted to one of said rods, slotted to accommodate the opposite rod, and provided with a semi-circular slot to accommodate the other half of said flange, said clamping plate having an angular cut along its edge adjacent the edge of said spacer plate and opposite the pivot rod to facilitate pivoting said clamping plate to alow removal and replacement of said chamber.

9. The apparatus of claim 8 including means for locking said clamping plate in position against said annular flange.

10. A process for molding a moldable solid plastic material in a cylindrical molding chamber open at both ends which comprises moving into said zone from one end a reciprocable compression piston to seal said end of said zone and a reciprocable core piston substantially completely thru said zone; introducing said material to the annular section of said zone surrounding said core piston; extending into the opposite end of said zone a second compression piston occupying the entire transverse cross section of said chamber to seal said zone; thereafter moving said second piston forward and simultaneously evacuating gas from said chamber thru a valved channel in the forward end of said second piston until its forward end contacts said core piston; closing said valve upon said contact; and compressing said material between said compression pistons.

11. The process of claim 10 wherein both of said compression pistons are forced toward the center of said compression chamber.

12. The process of claim 10 including the steps of removing said second compression piston after molding said material and forcing the resulting mold out of said zone with the other compression piston.

13. A process for molding solid plastic rocket grain material into a hollow-cored grain which comprises loading said material into a cylindrical chamber closed at one end by a compression piston and containing an axial core member slidable axially toward said piston; closing the opposite end of said chamber with a second compression piston occupying the entire cross-section of said chamber so as to seal said chamber; evacuating trapped gas from said chamber thru a valved conduit in said second piston during the initial forward movement of said second piston within said chamber; and compressing said material by application of pressure to both said pistons.

14. In combination with the apparatus of claim 8, an extrusion mold assembly adapted to replace said molding chamber comprising a split cylindrical extrusion support cylinder having an external support flange corresponding in size to the annular support flange on said molding chamber, a coaxial cylindrical extrusion mold within said support cylinder supported thereby, a mold die in the lower end of said extrusion mold supported by said support cylinder and extending thru the lower end thereof, and a perforate extrusion mold plate across said extrusion mold adjacent said die; a cutoff assembly cooperative with said extrusion mold assembly pivotably attached to one of said support rods to rotate in a horizontal plane just below said extrusion mold assembly comprising a support plate having a cut-off knife mounted thereon, a hopper supported by said support plate so as to receive extruded material when said plate is rotated into operating position, and means for holding said cut-off assembly in operating position.

15. In combination in a molding press, a removable compression molding assembly having a pair of opposed compression pistons; an extrusion mold assembly adapted to replace said molding assembly and utilize one of said pistons to force extrudable material thru said extrusion mold assembly.

16. The apparatus of claim 15 including cut-off means for cutting extruded material to desired length pivotally mounted on said press so as to be rotatable into and out of cutting position.

17. In combination in a molding press, support means for a mold; a pair of opposed, independently operable compression pistons positioned in said press to move into opposite ends of said mold; a compression mold open at both ends supportable in said support means in alignment with said pistons; and an extrusion mold adapted to replace said compression mold and to use one of said pistons in extrusion.

18. The combination of claim 17 including an extrusion cut-off assembly pivotally mounted on said press and moveable into and out of alignment with said extrusion mold adjacent its end opposite said one piston.

References Cited in the file of this patent

UNITED STATES PATENTS

| | | |
|---|---|---|
| 1,624,904 | Claus | Apr. 12, 1927 |
| 1,823,180 | White et al. | Sept. 15, 1931 |
| 1,826,945 | McKay et al. | Oct. 13, 1931 |
| 2,209,404 | Lassman | July 30, 1940 |
| 2,398,227 | Hubbert | Apr. 9, 1946 |
| 2,549,939 | Shaw et al. | Apr. 24, 1951 |
| 2,608,826 | Haller | Sept. 2, 1952 |
| 2,762,078 | Haller | Sept. 11, 1956 |

FOREIGN PATENTS

| | | |
|---|---|---|
| 655,585 | Great Britain | July 25, 1951 |